(12) United States Patent
Hayashi et al.

(10) Patent No.: US 9,077,899 B2
(45) Date of Patent: Jul. 7, 2015

(54) IMAGE PICKUP APPARATUS, IMAGE PROCESSING APPARATUS, IMAGE PROCESSING METHOD, PROGRAM AND RECORDING MEDIUM

(71) Applicant: Sony Corporation, Tokyo (JP)

(72) Inventors: Naoki Hayashi, Chiba (JP); Atsushi Kimura, Tokyo (JP); Yasuhito Shikata, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/721,693

(22) Filed: Dec. 20, 2012

(65) Prior Publication Data

US 2013/0106992 A1    May 2, 2013

Related U.S. Application Data

(63) Continuation of application No. 12/583,862, filed on Aug. 27, 2009.

(30) Foreign Application Priority Data

Sep. 4, 2008 (JP) ................................. 2008-227582

(51) Int. Cl.
H04N 7/00 (2011.01)
H04N 5/232 (2006.01)
G03B 37/00 (2006.01)

(52) U.S. Cl.
CPC ............ *H04N 5/23238* (2013.01); *G03B 37/00* (2013.01); *H04N 5/23293* (2013.01)

(58) Field of Classification Search
None
See application file for complete search history.

(56) References Cited

U.S. PATENT DOCUMENTS

| 2005/0185070 A1 | 8/2005 | Cheatle |
| 2005/0237383 A1 | 10/2005 | Soga |
| 2005/0270385 A1 | 12/2005 | Shioya et al. |
| 2006/0120625 A1 | 6/2006 | Peleg et al. |

(Continued)

FOREIGN PATENT DOCUMENTS

| JP | 2000-244814 A | 9/2000 |
| JP | 2005-333396 A | 12/2005 |
| JP | 2008167092 A | 7/2008 |

OTHER PUBLICATIONS

European Search Report, EP 09169405, dated Dec. 21, 2009.

(Continued)

*Primary Examiner* — Joseph Ustaris
*Assistant Examiner* — Kevin McInnish
(74) *Attorney, Agent, or Firm* — Lerner, David, Littenberg, Krumholz & Mentlik, LLP

(57) ABSTRACT

An image pickup apparatus includes an image pickup device that converts an image entering through a lens system into a captured image; a display unit that displays an image with a first field angle obtained from the captured image that is currently being shot; a moving distance detecting unit that detects a moving distance between images with the first field angle based on a plurality of images with the first angle sequentially captured; a partial image storing unit that stores an image with a second field angle that is less than the first field angle; and a panorama composing unit that composes a panoramic image based on a plurality of images with the second field angle stored in the partial image storing unit and the moving distances between the images with the first field angle that are respectively associated with the plurality of images with the second field angle.

23 Claims, 9 Drawing Sheets

(56) References Cited

U.S. PATENT DOCUMENTS

| | | |
|---|---|---|
| 2007/0025723 A1 | 2/2007 | Baudisch et al. |
| 2007/0147812 A1 | 6/2007 | Nenonen et al. |
| 2007/0153092 A1 | 7/2007 | Yang et al. |
| 2008/0111831 A1* | 5/2008 | Son et al. .................. 345/629 |
| 2008/0159652 A1* | 7/2008 | Shimizu .................... 382/284 |
| 2009/0234473 A1 | 9/2009 | Andersson |

OTHER PUBLICATIONS

Summons to attend oral proceedings pursuant to Rule 115 (1) EPC, dated May 21, 2012.

* cited by examiner

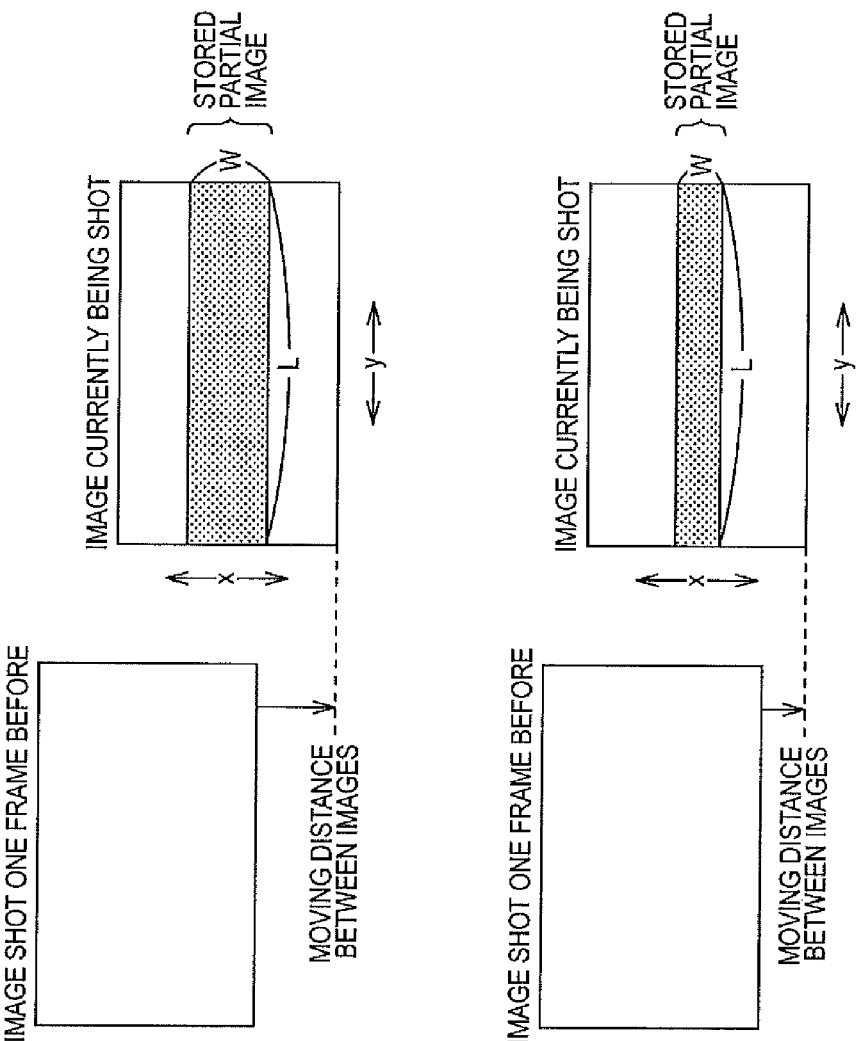

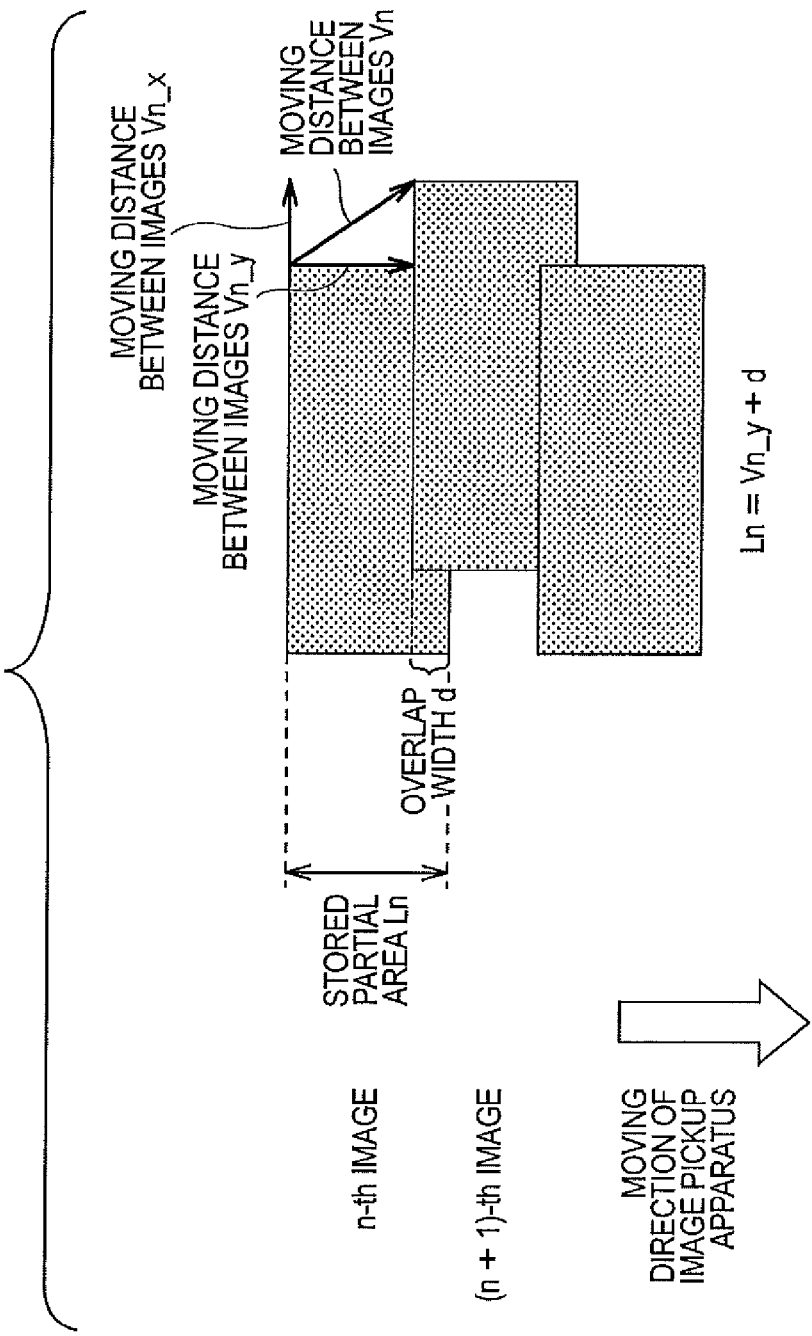

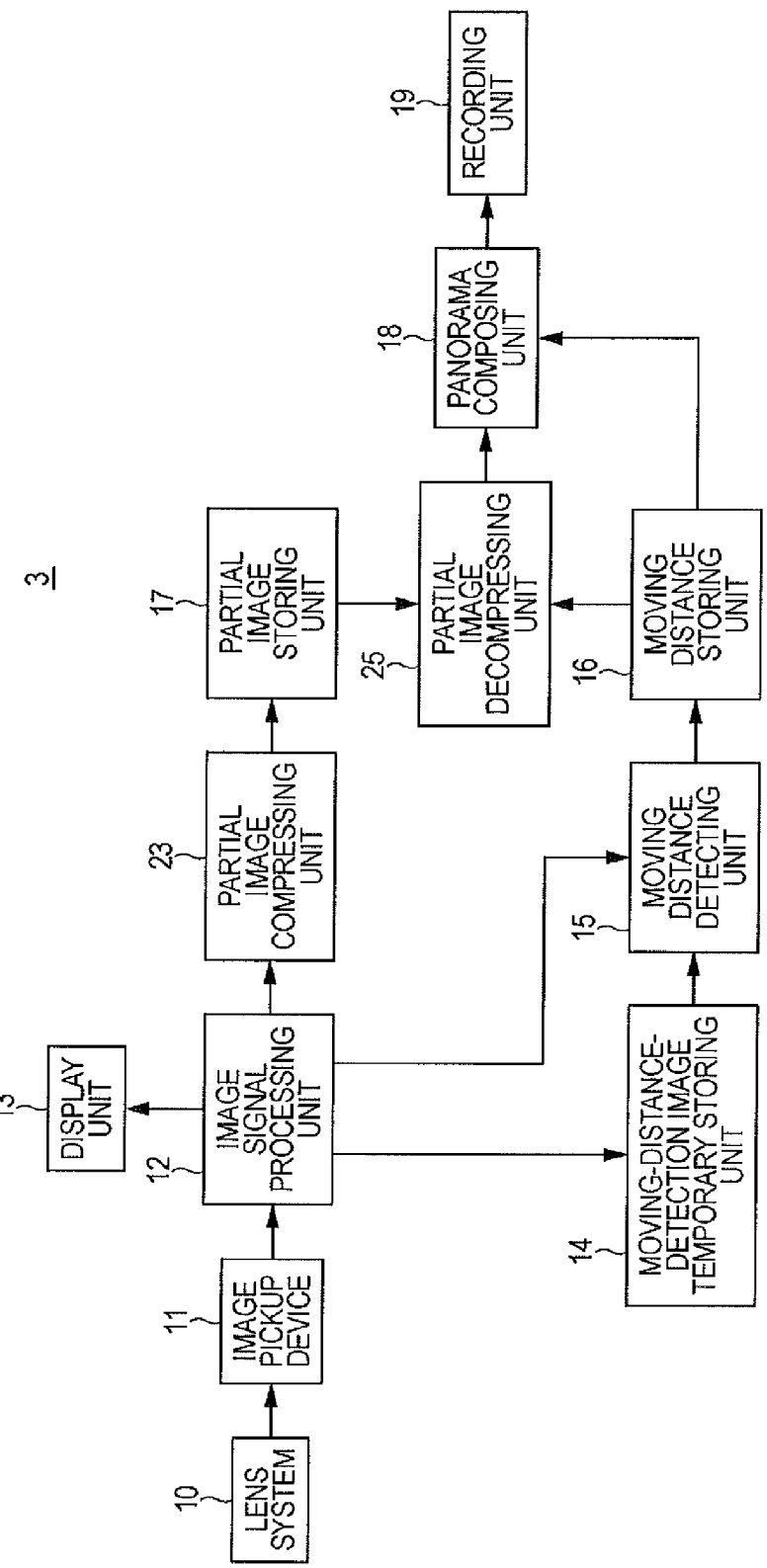

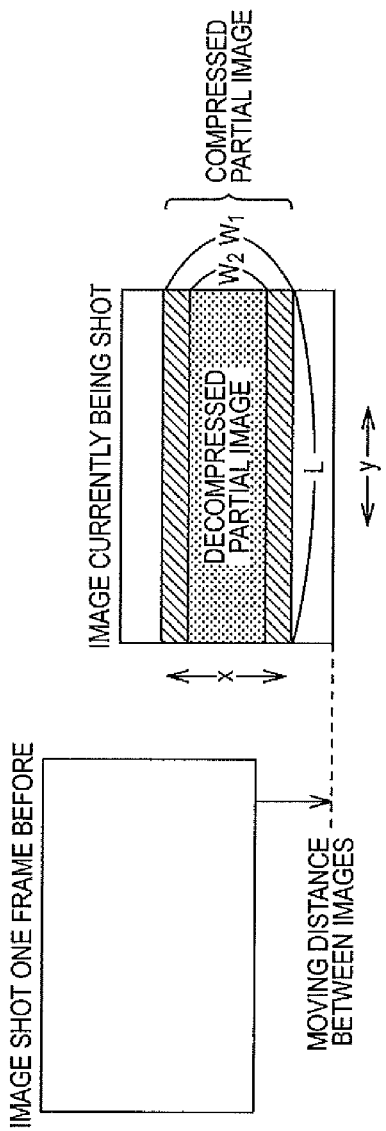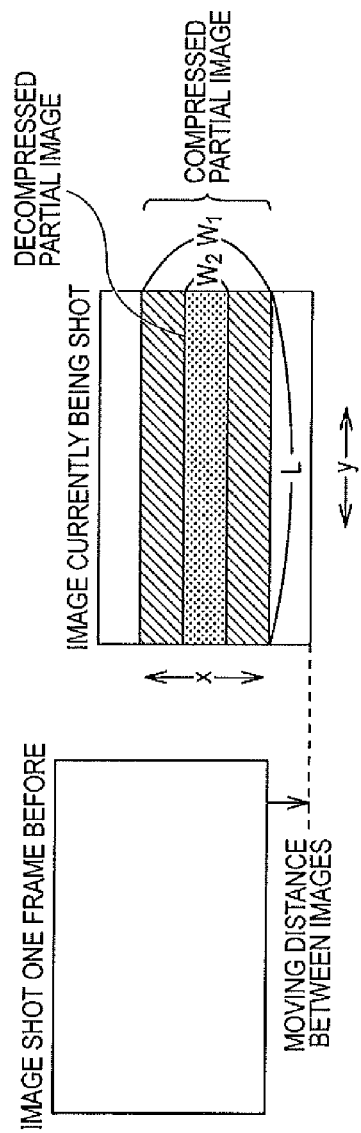
FIG. 7A
MOVING DISTANCE BETWEEN IMAGES IS LARGE
FIG. 7B
MOVING DISTANCE BETWEEN IMAGES IS SMALL

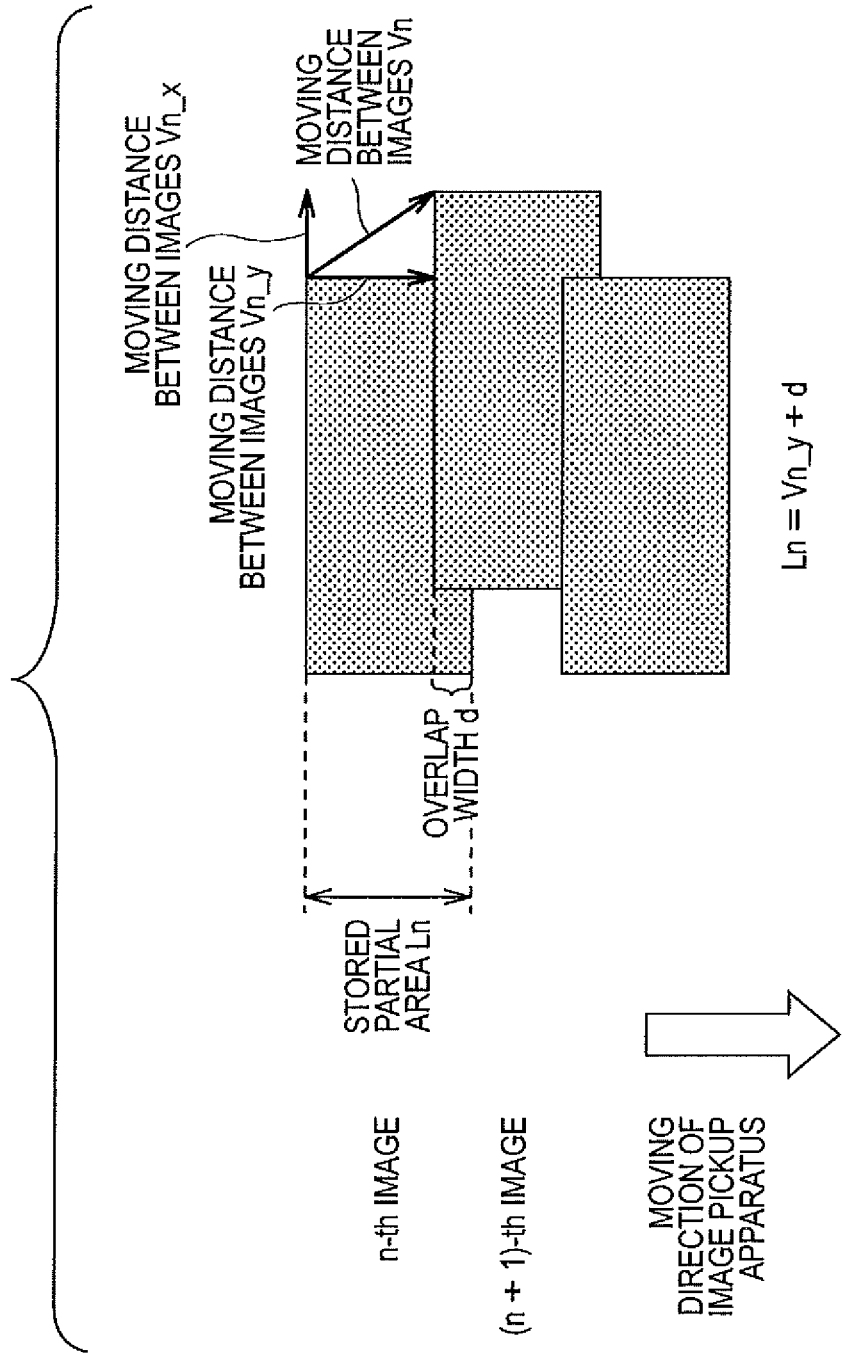

IMAGE PICKUP APPARATUS, IMAGE PROCESSING APPARATUS, IMAGE PROCESSING METHOD, PROGRAM AND RECORDING MEDIUM

CROSS-REFERENCE TO RELATED APPLICATION

The present application is a continuation of U.S. patent application Ser. No. 12/583,862, filed on Aug. 27, 2009, which claims priority from Japanese Patent Application No. JP 2008-227582 filed in the Japanese Patent Office on Sep. 4, 2008, the disclosures of which are incorporated herein by reference.

BACKGROUND OF THE INVENTION

1. Field of the Invention

The present invention relates to image pickup apparatuses, image processing apparatuses, image processing methods, programs and recording media for composing panoramic images from images captured with an image pickup apparatus being moved.

2. Description of the Related Art

In recent years, various camera systems for capturing panoramic images have been proposed. These camera systems are roughly categorized into multi-eyed camera systems in which the whole image of a wide field of view is captured at once using a camera with multiple lenses and single-eyed camera systems in which individual images constituting a wide field of view are continuously captured using a camera with a single lens being shifted in a shooting direction. A multi-eyed camera system has an advantage in that the whole panoramic image can be produced through an operation almost similar to that of a typical camera, but also has a disadvantage in that the camera system is expensive.

On the other hand, a panoramic image can be obtained at a comparatively low cost using a single-eyed camera system. Several methods have been proposed in which a panoramic image is captured using such a single-eyed camera system being shifted in a shooting direction. For example, a method to manually shift or rotate an image pickup system at a constant speed (refer to Japanese Unexamined Patent Application Publication No. 11-88754, for example) and a method to manually repeat the shift or rotation and stop of an image pickup system (refer to Japanese Unexamined Patent Application Publication No. 11-88811, for example) are disclosed. Further, a method to shift, rotate and stop an image pickup system by a stepping motor or the like is disclosed in Japanese Unexamined Patent Application Publication No. 2005-333396.

SUMMARY OF THE INVENTION

In any of the above-mentioned methods, it is important to calculate accurate moving distances between sequentially captured images in order to combine the images seamlessly. In addition, it is necessary to temporarily store the sequentially captured images before composing a panoramic image. It is desirable to minimize a memory area to temporarily store the images in order to keep the cost of the memory area low.

In the calculation of moving distances between sequentially captured images, if the moving distances between images are calculated from images with a narrow slit-like angle of view (slit-like field angle), overlap areas between the captured images become very narrow when the moving distance is large. Therefore, if the moving distances between images are calculated from the images with a narrow slit-like angle of view, there is a high possibility that objects with some features are not included in images in the overlap areas, so that it often happens that the accurate calculation of the moving distances between images may not be obtained. As mentioned above, if the accurate calculation of the moving distances between images may not be obtained, misalignments at the junctions of the images become conspicuous when a panoramic image is composed by combining a plurality of images, with the result that a desirable composite image may not be obtained.

On the other hand, if moving distances are calculated from images with a wide angle of view (wide field angle), the accuracy of the calculation of the moving distances between images is improved, but because a large memory area to temporarily store the sequentially captured images may be provided, the cost of the memory area becomes high. In addition, when capturing a panoramic image, an imaging apparatus is often caused to move undesirably, so that it is difficult to capture a panoramic image easily as intended by a photographer.

Accordingly, it is desirable to provide an image pickup apparatus, an image processing apparatus, an image processing method, a program, and a recording medium for enabling the accurate detection of moving distances, the reduction of a memory area, the easy shooting as intended by a photographer.

An image pickup apparatus according to an embodiment of the present invention includes an image pickup unit that converts an image entering through a lens system into a captured image; a display unit that displays an image with a first field angle obtained from the captured image that is currently being shot; a moving distance detecting unit that detects a moving distance between images with the first field angle based on a plurality of images with the first angle sequentially captured; a partial image storing unit that stores an image with a second field angle that is less than the first field angle; and a panorama composing unit that composes a panoramic image based on a plurality of images with the second field angle stored in the partial image storing unit and the moving distances between the images with the first field angle that are respectively associated with the plurality of images with the second field angle.

An image processing apparatus according to an embodiment of the present invention includes a moving distance detecting unit that detects a moving distance between images with a first field angle based on a plurality of sequential images with the first angle obtained from input signals; a partial image storing unit that stores an image with a second field angle that is less than the first field angle; and a panorama composing unit that composes a panoramic image based on a plurality of images with the second field angle stored in the partial image storing unit and the moving distances between the images with the first field angle that are respectively associated with the plurality of images with the second field angle.

An image processing method according to an embodiment of the present invention includes the steps of: detecting moving distances between images with a first field angle based on a plurality of sequential images with the first angle obtained from input signals; storing a partial image with a second field angle that is less than the first field angle; and composing a panoramic image based on a plurality of images with the second field angle and the moving distances between the images with the first field angle that are respectively associated with the plurality of images with the second field angle.

A program according to an embodiment of the present invention is a program for causing an information processing apparatus to perform an image processing method, the image processing method including the steps of: detecting moving distances between images with a first field angle based on a plurality of sequential images with the first angle obtained from input signals; storing a partial image with a second field angle that is less than the first field angle; and composing a panoramic image based on a plurality of images with the second field angle and the moving distances between the images with the first field angle that are respectively associated with the plurality of images with the second field angle.

A recording medium according to an embodiment of the present invention is a recording medium for recording a program for causing an information processing apparatus to perform an image processing method, the image processing method including the steps of: detecting moving distances between images with a first field angle based on a plurality of sequential images with the first angle obtained from input signals; storing a partial image with a second field angle that is less than the first field angle; and composing a panoramic image based on a plurality of images with the second field angle and the moving distances between the images with the first field angle that are respectively associated with the plurality of images with the second field angle.

In embodiments of the present invention, because moving distances between images are detected based on the images with a wide first field angle, the moving distances can be detected accurately. In embodiments of the present invention, a memory area to store the images can be reduced because only images with a second field angle that is less than the first field angle are stored. In addition, in embodiments of the present invention, undesirable movement of an imaging apparatus, for example, in a direction perpendicular to the moving direction of the imaging apparatus can be reduced by displaying an image with a wide first field angle on a display unit during shooting, so that the shooting can be easily performed as intended by a photographer.

BRIEF DESCRIPTION OF THE DRAWINGS

FIGS. 4A and 4B are diagrams for explaining an example of a method to change a field angle of a partial image based on a moving distance between images;

FIG. 5 is a diagram for explaining an example of a method to calculate a moving distance between images;

FIG. 6 is a block diagram showing a configuration example of an image pickup apparatus according to a third embodiment of the present invention;

FIGS. 7A and 7B are diagrams for explaining an example of a method to change a field angle of a decompressed partial image based on a moving distance between images;

FIG. 8 is a diagram for explaining an example of a method to calculate a moving distance between images.

DESCRIPTION OF THE PREFERRED EMBODIMENTS

Preferred embodiments of the present invention (hereafter called embodiments) will be described below. The embodiments are described in the following order.

1. First Embodiment (a partial image can be changed in accordance with a shooting direction)

2. Second Embodiment (a temporary stored area can be changed)

3. Third Embodiment (a partial decompressed area can be changed)

First Embodiment

Figure 1:
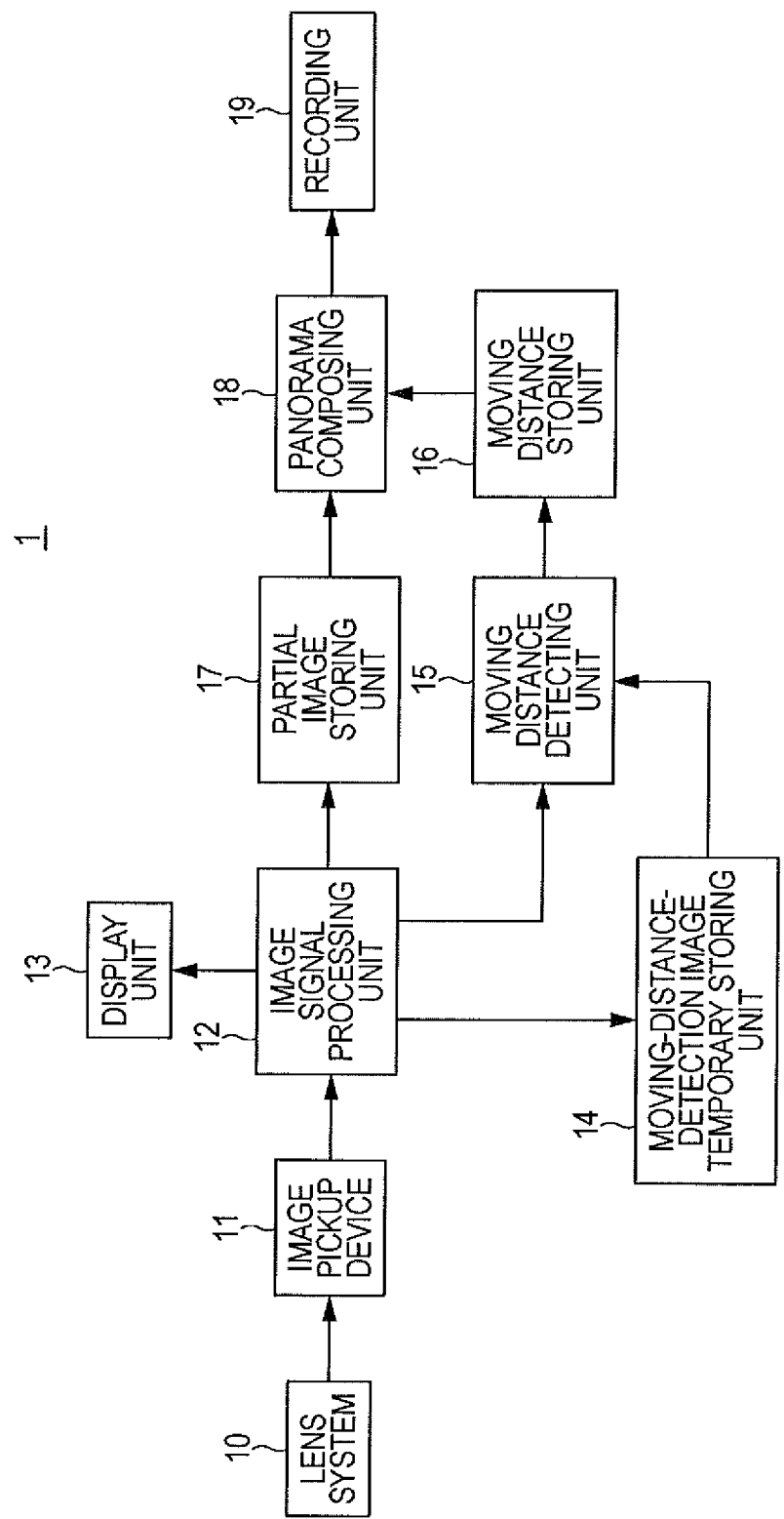
FIG. 1 is a block diagram showing a configuration example of an image pickup apparatus according to a first embodiment of the present invention.

FIG. 1 is a block diagram showing a configuration of an image pickup apparatus 1 according to a first embodiment. The image pickup apparatus 1 according to the first embodiment includes a lens system 10, an image pickup device 11, an image signal processing unit 12, a display unit 13, a moving-distance-detection image temporary storing unit 14, a moving distance detecting unit 15, a moving distance storing unit 16, a partial image storing unit 17, a panorama composing unit 18, and a recording medium 19.

In the image pickup apparatus 1, the image of an object is captured by the image pickup device 11 through the lens system 10. A CCD (Charge Coupled Device) sensor, a CMOS (Complementary Metal Oxide Semiconductor) sensor, or the like is used as the image pickup device 11. The image of the object captured by the image pickup device 11 is converted into an electric signal (image pickup signal) by the image pickup device 11. The image pickup device 11 has a predetermined signal processing circuit (not shown in the figure) that converts the electric signal into digital image data. The digital image data is supplied to the image signal processing unit 12.

The image signal processing unit 12 performs gamma correction, edge enhancement correction, and other processes on the digital image data supplied from the image pickup device 11. The image signal processing unit 12 supplies an image with a wide field angle (hereafter called an image with a first field angle) obtained from the image pickup signal to the display unit 13, the moving-distance-detection image temporary storing unit 14, the moving distance detecting unit 15, and the partial image storing unit 17.

The display unit 13 displays the image with the first field angle supplied from the image signal processing unit 12. A liquid crystal panel or the like is used as the display unit 13.

The moving-distance-detection image temporary storing unit 14 stores the image with the first field angle that is currently being shot and supplied from the image signal processing unit 12, and supplies the one-frame preceding image with the first field angle to the moving distance detecting unit 15.

The image with the first field angle that is currently being shot is supplied to the moving distance detecting unit 15 from the image signal processing unit 12. The one-frame preceding image with the first field angle stored in the moving-distance-detection image temporary storing unit 14 is also supplied to the moving distance detecting unit 15. The moving distance detecting unit 15 calculates moving distances between a plurality of images with the first field angle that are sequentially captured, and supplies the moving distances to the moving distance storing unit 16.

The moving distance storing unit 16 sequentially stores the moving distances between the plurality of images with the first field angle calculated by the moving distance detecting unit 15 during shooting, and supplies the stored moving distances between the plurality of images with the first field angle to the panorama composing unit 18 after the shooting.

The image signal processing unit 12 supplies the image with the first field angle, which is currently being shot, to the partial image storing unit 17. The partial image storing unit 17 sequentially stores a rectangular image with a field angle narrower than the first field angle (hereafter called an image with a second field angle), in which the image with the second field angle is cut out in accordance with a shooting direction. Subsequently, the partial image storing unit 17 supplies a plurality of stored images with the second field angle to the panorama composing unit 18 after the shooting.

Figure 2B:
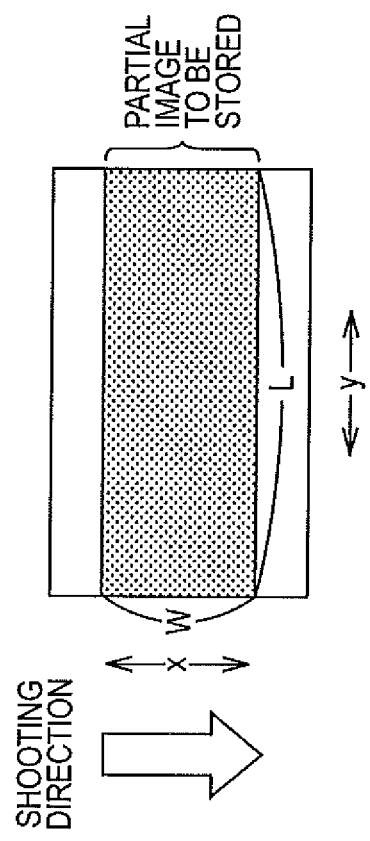
FIGS. 2A and 2B are diagrams for explaining an example of a method to cut out a partial image in accordance with a shooting direction.
Figure 2A:
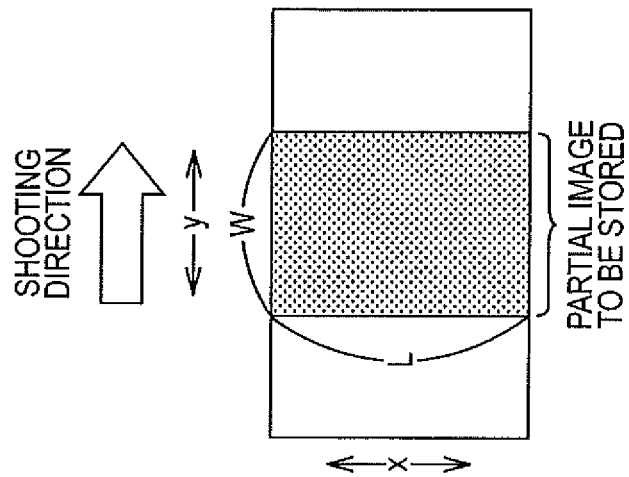

FIGS. 2A and 2B are diagrams for explaining a method to cut out an image with a second field angle in accordance with a shooting direction. The partial image storing unit 17 changes the direction of the cutout field angle of the image with the second field angle in accordance with the shooting direction when it stores the image with the second field angle as shown in FIGS. 2A and 2B. Specifically, as shown in FIG. 2A, if the moving direction of the image pickup apparatus (shooting direction) is approximately perpendicular to the longitudinal direction y of the image pickup apparatus 1, the partial image storing unit 17 cuts out the image with the second field angle so that the side of the image parallel to the longitudinal direction y of the image pickup apparatus 1 is long. As shown in FIG. 2B, if the moving direction of the image pickup apparatus 1 (shooting direction) is approximately parallel to the longitudinal direction y of the image pickup apparatus 1, the partial image storing unit 17 cuts out the image with the second field angle so that the side of the image in the short-side direction x of the image pickup apparatus 1 is long. In other words, the partial image storing unit 17 changes the cutout length W of the side of the image with the second field angle approximately parallel to the moving direction of the image pickup apparatus 1, while the length L of the side of the image with the second field angle approximately perpendicular to the moving direction of the image pickup apparatus 1 being constant when the partial image storing unit 17 stores the image with the second field angle that is rectangular in shape.

In this case, it is preferable that the cutout field angle of the image with the second field angle, that is, the length W of the short side, is made constant in the partial image storing unit 17 in consideration of easiness of implementation on hardware and software or the like. For example, it is preferable that the length W of the short side of the image with the second field angle is made about half the length of the side of the image with the first field angle along the longitudinal direction y or about half the length of the side of the image with the first field angle along the short-side direction x in the partial image storing unit 17.

After the shooting, the plurality of images with the second field angle stored during the shooting are supplied to the panorama composing unit 18 from the partial image storing unit 17. In addition, the moving distances between images, which were stored in the moving distance storing unit 16 and respectively associated with the plurality of images with the second field angle, are supplied to the panorama composing unit 18 from the moving distance storing unit 16. The panorama composing unit 18 composes a panoramic image using sequential images with the second field angle based on the moving distances between images. As mentioned above, the panorama composing unit 18 composes the panoramic image after the shooting, using the plurality of images with the second field angle stored in the partial image storing unit 17 based on the moving distances between images that are stored in the moving distance storing unit 16 and respectively associated with the images with the second field angle. After performing JPEG or other compression processing on the composed panoramic image, the panorama composing unit 18 supplies the compressed panoramic image to the recording medium 19.

The recording medium 19 stores the panoramic image composed by the panorama composing unit 18. The recording medium 19 can be of any kind as long as it can record digital signals. For example, a hard disk, a magneto optical disk, a DVD (Digital Versatile Disc), an MD™, a semiconductor memory, a magnetic tape and the like can be used as the recording medium 19.

As mentioned above, in the image pickup apparatus 1 according to the first embodiment, moving distances between images can be accurately detected because the moving distances between images are detected by the moving distance detecting unit 15 based on the images with a wide first field angle. In the image pickup apparatus 1, a memory area of the partial image storing unit 17 can be kept small because only the images with a second field angle that is less than the first field angle are stored in the partial image storing unit 17. In addition, in the image pickup apparatus 1, undesirable movement of the image pickup apparatus 1, for example, in a direction perpendicular to the moving direction of the image pickup apparatus 1 can be reduced by displaying an image with a wide first field angle on the display unit 13 during the shooting, so that the shooting can be easily performed as intended by a photographer.

Second Embodiment

Figure 3:
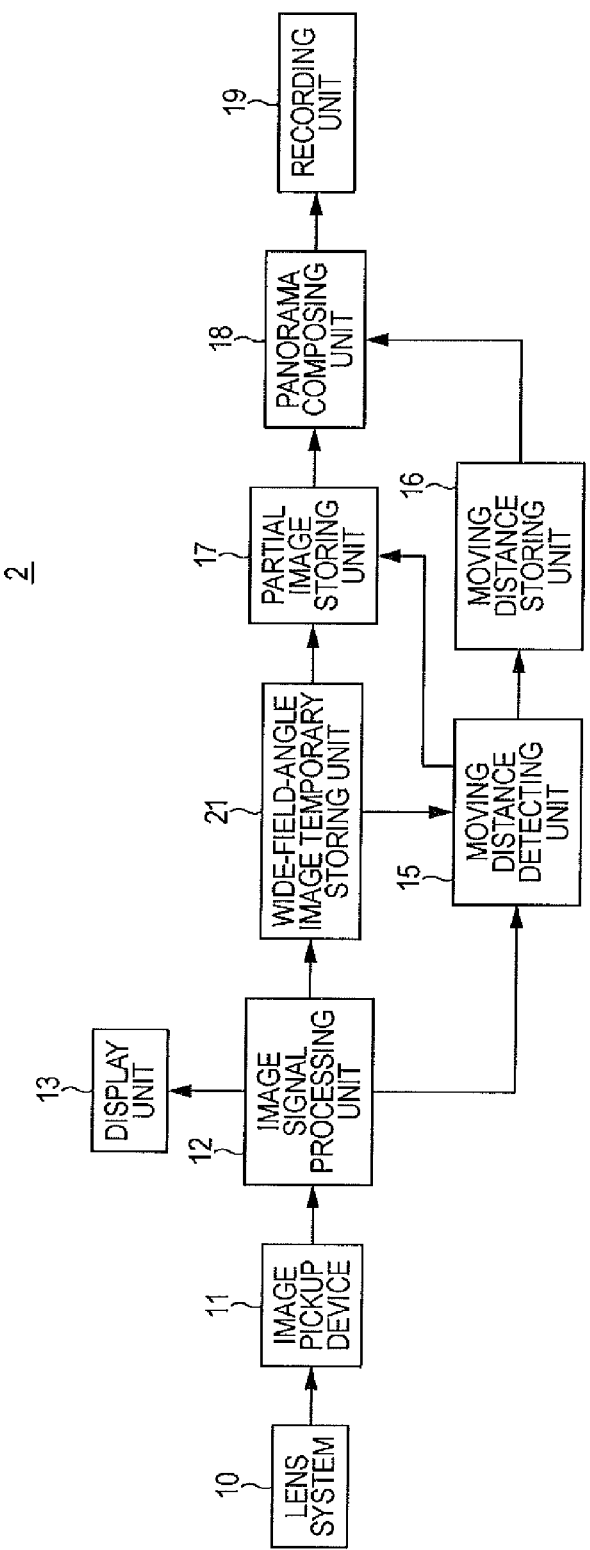
FIG. 3 is a block diagram showing a configuration example of an image pickup apparatus according to a second embodiment of the present invention.

An image pickup apparatus 2 according to a second embodiment will be described below. FIG. 3 is a block diagram showing a configuration of the image pickup apparatus 2 according to the second embodiment. The image pickup apparatus 2 includes a lens system 10, an image pickup device 11, an image signal processing unit 12, a display unit 13, a moving distance detecting unit 15, a moving distance storing unit 16, a partial image storing unit 17, a panorama composing unit 18, a recording medium 19, and a wide-field-angle image temporary storing unit 21. Compared with the above-mentioned image pickup apparatus 1 according to the first embodiment, the image pickup apparatus 2 is different in the following points. Specifically, the image pickup apparatus 2 is different from the image pickup apparatus 1 in that the image pickup apparatus 2 includes the wide-field-angle image temporary storing unit 21 instead of the moving-distance-detection image temporary storing unit 14, and the wide-field-angle image temporary storing unit 21 supplies images with a first field angle to the moving distance detecting unit 15 and the partial image storing unit 17. Components of the image pickup apparatus 2 that are the same as those of the image pickup apparatus 1 are given the same reference numerals, and detail descriptions thereof are omitted.

In the image pickup apparatus 2, the image of an object is captured by the image pickup device 11 through the lens system 10. The image signal processing unit 12 performs gamma correction, edge enhancement correction, and the like. The image signal processing unit 12 supplies an image with a wide field angle to the display unit 13, the wide-field-angle image temporary storing unit 21, and the moving distance detecting unit 15. The display unit 13 displays the image with the first field angle supplied from the image signal processing unit 12.

The wide-field-angle image temporary storing unit 21 stores the image with the first field angle that is currently being shot, and supplies the one-frame preceding image with the first field angle to the moving distance detecting unit 15 and the partial image storing unit 17.

The image with the first field angle that is currently being shot is supplied to the moving distance detecting unit 15 from the image signal processing unit 12. The one-frame preceding image with the first field angle stored in the wide-field-angle image temporary storing unit 21 is also supplied to the moving distance detecting unit 15. The moving distance detecting unit 15 detects the moving distance between the images with the first field angle sequentially captured, that is, the moving distance between the images with the first field angle based on the current image with the first field angle and the one-frame preceding image with the first field angle. Subsequently, the moving distance detecting unit 15 supplies the detected moving distance between the images with the first field angle to the moving distance storing unit 16 and the partial image storing unit 17.

The moving distance storing unit 16 sequentially stores moving distances between a plurality of the images with the first field angle detected during shooting by the moving distance detecting unit 15, and supplies the stored moving distances between the images with the first field angle to the panorama composing unit 18 after the shooting.

The moving distance between the images with the first field angle detected by the moving distance detecting unit 15 are supplied to the partial image storing unit 17, and the one-frame preceding image with the first field angle is supplied to the partial image storing unit 17 from the wide-field-angle image temporary storing unit 21. When storing the image with the second field angle, the partial image storing unit 17 changes the cutout field angle of the image with the second field angle based on the moving distance between the images with the first field angle detected by the moving distance detecting unit 15. In other words, the partial image storing unit 17 sequentially stores during shooting the images with the second field angle while adaptively changing the second field angle based on information on the moving distances between images supplied from the moving distance detecting unit 15, in which part of the image with the first field angle is changed in accordance with a shooting direction to obtain the image with the second field angle.

FIGS. 4A and 4B are diagrams for explaining a method to change a field angle of a partial image based on a moving distance between images. The partial image storing unit 17 makes the cutout length of the side of the image with the second field angle approximately perpendicular to the moving direction of the image pickup apparatus 2, that is, the length L, constant. In addition, the partial image storing unit 17 makes the cutout length of the side of the image with the second field angle approximately parallel to the moving direction of the image pickup apparatus 2, that is, the length W, variable.

In the image pickup apparatus 2 according to the second embodiment, the image with the second field angle stored in the partial image storing unit 17 has a side of constant cutout length, that is, a side of length L, and the side of constant cutout length is determined by the shooting direction similarly to the first embodiment shown in FIGS. 2A and 2B.

Specifically, the above-mentioned W is determined in the way as shown in FIG. 5. Suppose that the moving direction of the image pickup apparatus 2 is denoted by y, the direction perpendicular to the direction y by x, and the length of the side in the direction y of a compressed image with the second field angle by Ln, in which the compressed image with the second field angle is part of an n-th image with the first field angle. Further suppose that the moving distance between the n-th image and the (n+1)-th image is denoted by Vn, the direction y component of Vn by Vn_y, the direction x component of Vn by Vn_x, and the overlap width between the images with the second field angle by d. In this case, the field angle of the image partially decompressed is changed so that W may be given by the following formula (1).

$$W = Ln - Vn\_y + d \qquad (1)$$

The partial image storing unit 17 supplies a plurality of images with the second field angle stored during the shooting to the panorama composing unit 18 after the shooting.

After the shooting, the panorama composing unit 18 is supplied with the plurality of images with the second field angle stored during the shooting in the partial image storing unit 17 and moving distances between the plurality of images stored in the moving distance storing unit 16, in which the moving distances are distances between the images respectively associated with the images with the second field angle. The panorama composing unit 18 composes a panoramic image using successive images with the second field angle based on the moving distances between images. As mentioned above, fast panorama composing process can be performed in the panorama composing unit 18 because the panoramic image is composed after the shooting. After performing compression processing such as JPEG on the composed panoramic image, the panorama composing unit 18 supplies the compressed panoramic image to the recording medium 19. The recording medium 19 stores the panoramic image composed in the panorama composing unit 18.

As mentioned above, in the image pickup apparatus 2 according to the second embodiment, because moving distances between images are detected based on images with a wide first field angle, the moving distances between images can be accurately detected. In the image pickup apparatus 2, a memory area to store images can be kept small because only the images with the second field angle are stored in the partial image storing unit 17. In the image pickup apparatus 2, the cutout field angles of the images with the second field angle stored in the partial image storing unit 17 are changed based on the moving distances between the images with the first field angle detected by the moving distance detecting unit 15. Therefore, in the image pickup apparatus 2, the memory area of the partial image storing unit 17 can be more reduced. In addition, in the image pickup apparatus 2, undesirable movement of the image pickup apparatus 2, for example, in a direction perpendicular to the moving direction of the image pickup apparatus 2 can be reduced by displaying an image with a wide first field angle on the display unit 13 during the shooting, so that the shooting can be easily performed as intended by a photographer.

Third Embodiment

An image pickup apparatus 3 according to a third embodiment will be described below. FIG. 6 is a block diagram showing a configuration example of an image pickup apparatus 3 according to a third embodiment. The image pickup apparatus 3 includes a lens system 10, an image pickup device 11, an image signal processing unit 12, a display unit 13, a moving-distance-detection image temporary storing unit 14, a moving distance detecting unit 15, a moving distance storing unit 16, a partial image storing unit 17, a panorama composing unit 18, a recording medium 19, a partial image compressing unit 23, and a partial image decompressing unit 25. Compared with the above-mentioned image pickup apparatus 1 according to the first embodiment, the image pickup apparatus 3 is different in the following points. Specifically, the image pickup apparatus 3 is different from the image pickup apparatus 1 in that the image pickup apparatus 3 includes the partial image compressing unit 23 and the partial image decompressing unit 25, and moving distances between images stored in the moving distance storing unit 16 are supplied to the partial image decompressing unit 25. In the image pickup apparatus 3 according to the third embodiment, the memory area of the partial image storing unit 17 can be more reduced as later described in detail. Components of the image pickup apparatus 3 that are the same as those of the image pickup apparatus 1 are given the same reference numerals, and detail descriptions thereof are omitted.

In the image pickup apparatus 3, the image of an object is captured by the image pickup device 11 through the lens system 10. The image of the object captured by the image pickup device 11 is converted into an electric signal by the image pickup device 11. The image signal processing unit 12 performs gamma correction, edge enhancement correction and the like, and supplies an image with a first field angle to the display unit 13, the moving-distance-detection image temporary storing unit 14, the moving distance detecting unit 15, and the partial image compressing unit 23. The images with the first field angle, which are currently being shot, are displayed on the display unit 13.

The moving-distance-detection image temporary storing unit 14 stores the image with the first field angle that is currently being shot, and supplies the one-frame preceding image with the first field angle to the moving distance detecting unit 15.

The image with the first field angle that is currently being shot is supplied to the moving distance detecting unit 15 from the image signal processing unit 12. The one-frame preceding image with the first field angle stored in the moving-distance-detection image temporary storing unit 14 is also supplied to the moving distance detecting unit 15. The moving distance detecting unit 15 detects the moving distance between the images with the first field angle sequentially captured, that is, the moving distance between the images with the first field angle based on the current image with the first field angle and the one-frame preceding image with the first field angle. The moving distance detecting unit 15 supplies the detected moving distances between the images with the first field angle to the moving distance storing unit 16.

The moving distance storing unit 16 sequentially stores moving distances between a plurality of images with the first field angle detected during shooting by the moving distance detecting unit 15. The moving distance storing unit 16 supplies the stored moving distances between the plurality of images with the first field angle to the partial image decompressing unit 25 and the panorama composing unit 18.

The image with the first field angle that is currently being shot is supplied to the partial image compressing unit 23 from the image signal processing unit 12. The partial image compressing unit 23 performs an image compression such as JPEG on part of the image with the first field angle in accordance with a shooting direction in order to reduce the memory area of the partial image storing unit 17. Subsequently, the partial image compressing unit 23 supplies the compressed partial image, that is, the image with a field angle smaller than the first field angle (hereafter called the image with a second field angle), to the partial image storing unit 17. The partial image compressing unit 23 changes the cutout area of the image with the first field angle to be compressed in accordance with the shooting direction similarly to the first embodiment shown in FIGS. 2A and 2B.

The partial image storing unit 17 sequentially stores a plurality of images with the second field angle supplied from the partial image compressing unit 23 during the shooting. The partial image storing unit 17 supplies the plurality of images with the second field angle stored during the shooting to the partial image decompressing unit 25 after the shooting.

After the shooting, the partial image storing unit supplies the plurality of images with the second field angle stored during the shooting to the partial image decompressing unit 25. In addition, the moving distance storing unit 16 supplies moving distances between a plurality of images that are respectively associated with the images with the second field angle to the partial image decompressing unit 25. The partial image decompressing unit 25 partially decompresses the images with the second field angle based on information on the moving distances between images, generates images with a field angle that is less than the second field angle (hereafter called images with a third field angle), and supplies the images with the third field angle to the panorama composing unit 18.

Specific processes performed in the partial image compressing unit 23, the partial image storing unit 17 and the partial image decompressing unit 25 will be described below.

FIGS. 7A and 7b are diagrams for explaining an example of a method to change the field angle of a partial image to be decompressed based on a moving distance between images. First, the partial image compressing unit 23 compresses an image with a first field angle supplied from the image signal processing unit 12, and generates, for example, an image with a second field angle with the length of its longitudinal side L and the length of its short side W1 as shown in FIGS. 7A and 7B. In this case, it is preferable that, when the partial image compressing unit 23 compresses the image with the first field angle, the compressed area of the image with the first field angle is made constant in consideration of reduction of the memory area in the partial image storing unit 17 and easiness of implementation on hardware and software or the like. For example, it is preferable that the compressed area of the image with the second field angle is about half the area of the image with the first field angle in the partial image compressing unit 23. As an alternative, the partial image compressing unit 23 can change the compressed area, for example, in accordance with the moving distance between images without making the compressed area constant.

Second, the partial image decompressing unit 17 sequentially stores a plurality of images with the second field angle supplied during the shooting from the partial image compressing unit 23, and supplies the images with the second field angle stored during the shooting to the partial image decompressing unit 25 after the shooting.

Third, the partial image decompressing unit 25 changes the rectangular decompressed area (decompressed part) of the image with the second field angle in accordance with the moving direction of the image pickup apparatus 3, and generates an image with a third field angle. The partial image decompressing unit 25 generates an image with a third field angle when the partial image decompressing unit 25 decompresses the compressed image with the second field angle, in which the length L of the side of the image with the third field angle that is approximately perpendicular to the moving direction of the image pickup apparatus 3 is made constant and the length W2 of the side of the image with the third field angle that is approximately parallel to the moving direction of the image pickup apparatus 3 is made variable.

For example, as shown in FIG. 7A, if the moving distance between the images with the first field angle supplied from the moving distance storing unit 16 is equal to or larger than a predetermined threshold value, the partial image decompressing unit 25 makes the decompressed area of the image with the second field angle large when decompressing the image with the second field angle. On the other hand, as shown in FIG. 7B, if the moving distance between the images with the first field angle supplied from the moving distance storing unit 16 is smaller than the predetermined threshold value, the partial image decompressing unit 25 makes the decompressed area of the image with the second field angle small when decompressing the image with the second field angle.

In this case, it is preferable that the partial image decompressing unit 25 decompresses the minimum area of the image with the second field angle so that a panoramic image can be created fast in the image pickup apparatus 3. In other words, when the image with the second field angle compressed by the partial image compressing unit 23 is decompressed, the time to decompress the image with the second field angle can be shortened in the partial image decompressing unit 25 by changing the decompressed area in accordance with the moving distance between images. Therefore a panoramic image can be composed fast in the image pickup apparatus 3, and waiting time before the panoramic image being created will be short, with the result that a user can comfortably enjoy the panoramic image.

Specifically, the area partially decompressed by the partial image decompressing unit 25 is determined in such a manner as shown in FIG. 8. Suppose that the moving direction of the image pickup apparatus 3 is denoted by y, the direction perpendicular to the direction y by x, and the length of the side in the direction y of a compressed image with the second field angle by Ln, in which the compressed image with the second field angle is part of an n-th image with the first field angle. Further suppose that the moving distance between the n-th image and the (n+1)-th image is denoted by Vn, the direction y component of Vn by Vn_y, the direction x component of Vn by Vn_x, and the overlap width between the images with the second field angle by d. In this case, the field angle of the image partially decompressed is changed so that Ln may be given by the following formula (2) in the partial image decompressing unit 25.

$$Ln = Vn\_y + d \quad (2)$$

After the shooting, the partial image decompressing unit 25 supplies a plurality of images with the third field angle to the panorama composing unit 18. Further, the moving distance storing unit 16 supplies the moving distances between a plurality of images that are respectively associated with the images with the third field angle to the panorama composing unit 18. The panorama composing unit 18 composes a panoramic image using successive images with the third field angle based on the moving distances between images. After performing compression processing such as JPEG on the composed panoramic image, the panorama composing unit 18 supplies the compressed panoramic image to the recording medium 19. The recording medium 19 stores the panoramic image composed in the panorama composing unit 18.

As mentioned above, in the image pickup apparatus 3 according to the third embodiment, because moving distances between images are detected based on images with a wide first field angle, the moving distances between images can be accurately detected.

In the image pickup apparatus 3, the memory area to store images can be kept small because only the images with the second field angle compressed by the partial image compressing unit 23 are stored in the partial image storing unit 17.

In addition, in the image pickup apparatus 3, the partial image decompressing unit 25 changes the decompressed area of the images with the second field angle read out from the partial image storing unit 17 in accordance with the moving distances between images from the moving distance storing unit 16, so that the partial image decompressing unit 25 can decompresses the minimum areas of the partial images. Therefore, a panoramic image can be composed fast in the image pickup apparatus 3.

In addition, in the image pickup apparatus 3, undesirable movement of the image pickup apparatus 3, for example, in a direction perpendicular to the moving direction of the image pickup apparatus 3 can be reduced by displaying an image with a wide first field angle on the display unit 13 during the shooting, so that the shooting can be easily performed as intended by a photographer.

Operation of Panorama Composing Process

Figure 9:
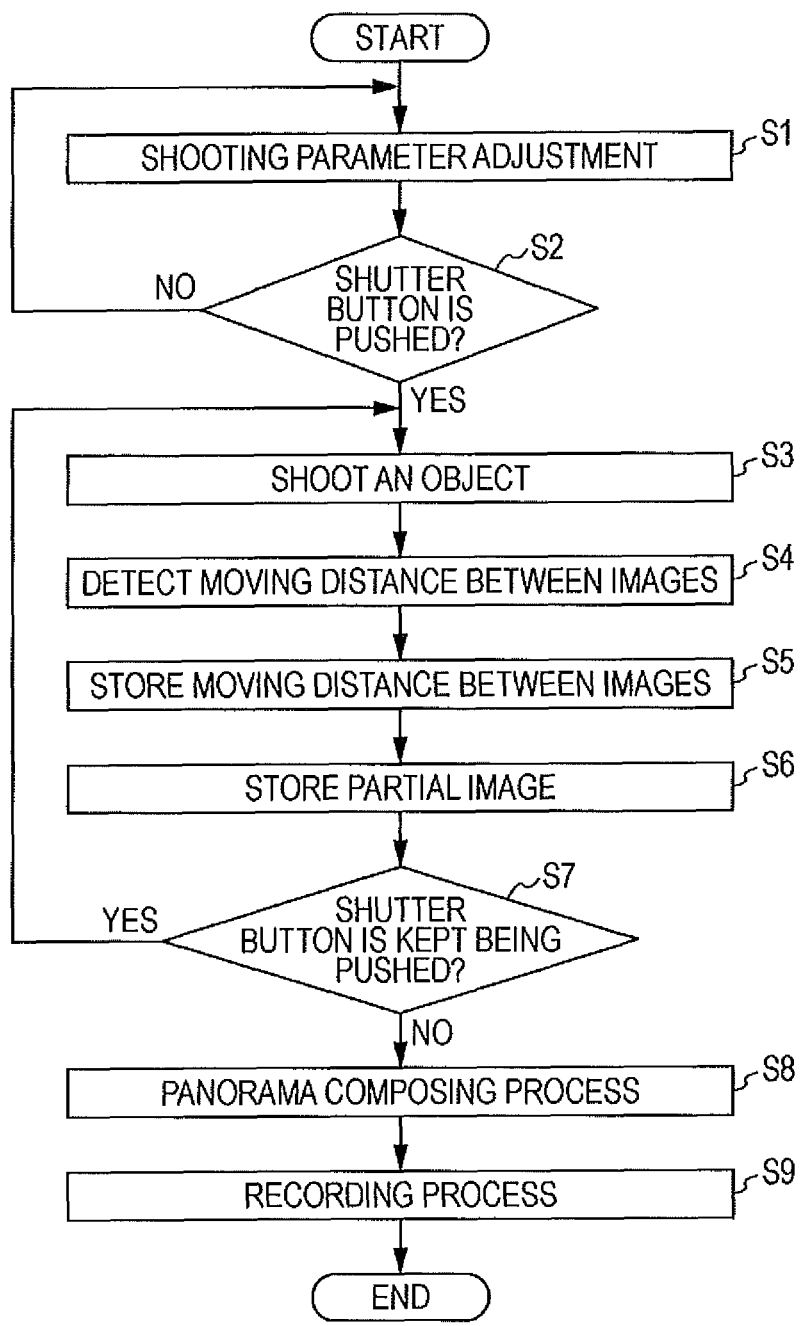
FIG. 9 is a flowchart for explaining an example of a panoramic image capturing process in an image pickup apparatus.

An example of capturing and composing procedure of a panoramic image in an image pickup apparatus according to an embodiment of the present invention will be described below with reference to FIG. 9. The above-mentioned image pickup apparatus 1 according to the first embodiment will be described below as an example.

First, in the image pickup apparatus 1, the procedure proceeds to the step S1 to calculate various shooting parameters after the diagnosis and initialization of hardware are made. At the step S1, information on luminance detected by an exposure meter is obtained, and shooting parameters such as an aperture value, a shutter speed are calculated.

At the step S2, shooting start timing is determined by detecting whether an operation signal caused by pushing a shutter button on an operation unit (not shown) is generated or not. If the operation signal caused by the pushing operation of the shutter button is identified (in the case of "YES" at the step S2), the procedure proceeds to the step S3. If the operation signal based on the pushing operation of the shutter button is not identified (in the case of "NO" at the step S2), the procedure goes back to the step S1 and the above-mentioned process is repeated.

At the step S3, an aperture driving unit of the lens system 10 is adjusted using the shooting parameters determined at the step S1, and then the capturing of an image, that is, the reading out of the image from the image pickup device 11 is performed. The image of an object captured on the imaging area is converted into an electric signal, that is, an image pickup signal by the image pickup device 11. Next, gamma correction, edge enhancement correction, and the like are performed by the image signal processing unit 12. An image that is being captured is displayed on the display unit 13, and an image with a wide first field angle is stored in the moving-distance-detection image temporary storing unit 14.

At the step S4, the moving distance detecting unit 15 detects a distance between images. Specifically, the image signal that is obtained at the step S3 is supplied to the moving distance detecting unit 15 from the image signal processing unit 12. The one-frame preceding image with the first field angle that is stored in the moving-distance-detection image temporary storing unit 14 is also supplied to the moving distance detecting unit 15. The moving distance detecting unit 15 detects the moving distance between images based on the current image with the first field angle and the one-frame preceding image with the first field angle.

At the step S5, the moving distance storing unit 16 stores the moving distance between the images with the first field angle detected by the moving distance detecting unit 15.

At the step S6, the partial image storing unit 17 stores an image with a second field angle that is part of the image processed at the step S3. In this case, the partial image storing unit 17 stores the image with the second field angle after performing compression processing such as JPEG on the image with the second field angle. If the method to change the stored area of the image with the second field angle is used as shown in the image pickup apparatus 2 according to the second embodiment in FIGS. 4A and 4B, an image area of the image to be stored is adaptively changed and stored in the partial image storing unit 17 based on the moving distance between images obtained at the step S4.

At the step S7, shooting end timing is determined by detecting whether the pushing operation of the shutter button on the operation unit is still being continued or not. If it is determined that the pushing operation of the shutter button is still being continued (in the case of "YES" at the step S7), the procedure goes back to the step S3 to continue the shooting, and the shooting of the object is repeated. On the other hand, if it is determined that the pushing operation of the shutter button has been stopped (in the case of "NO" at the step S7), the procedure proceeds to the step S8 to stop the shooting.

At the step S8, the panorama composing unit 18 performs panorama composing process. Specifically, a panoramic image is composed based on a plurality of images with the second field angle stored in the partial image storing unit 17 and moving distances between a plurality of images that are respectively associated with the plurality of images with the second field angle. In addition, in the case where partial images are compressed using JPEG or the like and stored in the image pickup apparatus 3 according to the third embodiment as shown in FIGS. 7A and 7B, the reading operation of the partial images are performed as follows. In other words, the image pickup apparatus 1 performs the reading operation of the partial images through adaptively changing an image area to be decompressed based on the moving distance between images calculated in the step S4 in order to increase the processing speed.

At the step S9, the composed panoramic image composed at the step S8 is stored in a recording medium 19.

As described above, in an image pickup apparatus according to an embodiment of the present invention, because moving distances between images are detected based on images with a wide first field angle obtained from captured images, the accurate detection of the moving distances can be achieved. In an image pickup apparatus according to an embodiment of the present invention, a memory area to store images can be kept small because only images with a second field angle that is less than the first field angle are stored. In addition, in an image pickup apparatus according to an embodiment, undesirable movement of the image pickup apparatus, for example, in a direction perpendicular to the moving direction of the image pickup apparatus can be reduced by displaying an image with a wide first field angle on a display unit during shooting, so that the shooting can be easily performed as intended by a photographer. In addition, in the image pickup apparatus according to the embodiment, because a panoramic image is composed using the images with a field angle that is less than the first field angle, image processing to smooth the seams at the junction of the images can be omitted when the panoramic image is composed. In other words, an image pickup apparatus according to an embodiment of the present invention can create a panoramic image that is deterioration-free in quality and seam-free at the junction of the images at a high speed.

The present invention can also be applied to, for example, an image processing apparatus other than the above-mentioned image pickup apparatuses. In addition, a series of processes described in the embodiments of the present invention can be performed by hardware, software, or a combination thereof. In the case where the series of processes is performed by software, it can be realized by installing a program recording the process sequence on a memory in a computer built in a dedicated hardware and executing the program, or by installing the program on a general-purpose computer that is capable of executing various processes and executing the program. In addition, various types of processes described in the embodiments can be performed not only in time-series order, but also in parallel or individually in accordance with the processing capacity of apparatuses to perform the processes, or if necessary.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup apparatus comprising:
   an image obtaining circuitry configured to capture and store a plurality of first images at a first field angle;
   a moving distance detecting circuitry configured to detect a moving distance between a pair of the first images that are sequentially captured; and
   a partial image storing circuitry configured to generate and store, during the capture of the plurality of first images, only a plurality of second images at a second field angle, wherein a length of the plurality of second images in a direction parallel to a moving direction of the image pickup apparatus is less than that of the plurality of first images, the plurality of first images having a leading edge and trailing edge in a direction parallel to the moving direction,
   wherein each second image is generated by cutting out a portion of the corresponding first image in accordance with the moving direction and a moving distance between a pair of the first images sequentially captured corresponding thereto, in which the cutting out is by cutting through at least one of the leading edge or the trailing edge of the first image only in a direction approximately perpendicular to the moving direction,
   in which, during the capture of the plurality of first images, the each second image is stored by discarding the portion of the corresponding first image that is cut out,
   wherein a panoramic image is created from the plurality of second images according to the moving distances.

2. The image pickup apparatus according to claim 1,
   wherein the moving distance detecting circuitry detects the moving distance when the plurality of first images is captured, and
   wherein the panoramic image is created after capturing the plurality of first images.

3. The image pickup apparatus according to claim 1,
   wherein the second field angle is less than the first field angle.

4. The image pickup apparatus according to claim 1, further comprising a panorama composing circuitry that creates the panoramic image after the plurality of second images is stored in the partial image storing circuitry.

5. The image pickup apparatus according to claim 4, further comprising:
   an image compressing circuitry that generates the plurality of second images by compressing the first images; and
   an image decompressing circuitry that decompresses the plurality of second images, generates a plurality of third images with a third field angle smaller than the second field angle, and supplies the plurality of third images to the panorama composing circuitry,
   wherein the partial image storing circuitry stores the plurality of second images supplied from the image compressing circuitry, and reads out and supplies the plurality of second images to the image decompressing circuitry.

6. The image pickup apparatus according to claim 4, further comprising a moving distance storing circuitry that stores the moving distance, wherein the panorama composing circuitry creates the panoramic image based on the moving distance and the plurality of second images stored in the partial image storing circuitry during sequential capture of the plurality of first images.

7. The image pickup apparatus according to claim 4, further comprising a moving distance storing circuitry that stores the moving distance, wherein the panorama composing circuitry creates the panoramic image based on the moving distance and the plurality of second images stored in the partial image storing circuitry after capture of the plurality of first images.

8. The image pickup apparatus according to claim 1, wherein, when the partial image storing circuitry stores the plurality of second images, the partial image storing circuitry changes a cutout field angle of the each second image based on the moving distance between the pair of the first images sequentially captured corresponding thereto.

9. The image pickup apparatus according to claim 1, wherein, subsequent to the cutting out, the each second image is stored by discarding the portion of the corresponding first image that is cut out such that the portions respectively of the corresponding first images cut out are not stored at a time when the panoramic image is created.

10. The image pickup apparatus according to claim 1, wherein the each second image is generated by cutting out such that, for the each second image, a length of a side of the second image extending in a direction approximately perpendicular to the moving direction is same.

11. The image pickup apparatus according to claim 1, wherein the partial image storing circuitry stores at least a part of the second images corresponding to the first images during a part of the first images being captured.

12. The image pickup apparatus according to claim 1, wherein a length of the leading edge or the trailing edge for cutting out in the direction approximately perpendicular to the moving direction is determined based on the moving distance.

13. The image pickup apparatus according to claim 1, wherein during the capture of the first images when the plurality of second images is generated and stored, the first images are stored at the apparatus such that, at any time, only a single image of the plurality of the first images is stored.

14. The image pickup apparatus according to claim 1, in which the first field angle has a frame area and the moving distance between a pair of the first images that are sequentially captured is detected using the frame area of the first field angle.

15. The image pickup apparatus according to claim 1, wherein the first images include a first frame, a second frame and third frame sequentially captured, in which the first frame is discarded after a first moving distance between the first frame and the second frame is detected, and in which the second frame is not discarded until after a moving distance between the second frame and the third frame is detected.

16. An image processing apparatus comprising:
a moving distance detecting circuitry configured to detect a moving distance between a pair of sequentially captured first images which are stored, wherein the first images are captured by an image pickup apparatus at a first field angle; and
a partial image storing circuitry configured to generate and store, during the capture of the first images, only a plurality of second images at a second field angle, wherein a length of the plurality of second images in a direction parallel to a moving direction of the image pickup apparatus is less than that of the plurality of first images, the plurality of first images having a leading edge and trailing edge in a direction parallel to the moving direction,
wherein each second image is generated by cutting out a portion of the corresponding first image in accordance with the moving direction and a moving distance between a pair of the first images sequentially captured corresponding thereto, in which the cutting out is by cutting through at least one of the leading edge or the trailing edge of the first image only in a direction approximately perpendicular in accordance with the moving direction,
in which, during the capture of the first images, the each second image is stored by discarding the portion of the corresponding first image that is cut out,
wherein a panoramic image is created from the plurality of second images according to the moving distances.

17. The image processing apparatus according to claim 16, wherein the moving distance detecting circuitry detects the moving distance when the first images are captured, and wherein the panoramic image is created after capturing the first images.

18. The image processing apparatus according to claim 16, wherein the second field angle is less than the first field angle.

19. The image processing apparatus according to claim 16, further comprising a panorama composing circuitry that creates the panoramic image by composing the plurality of second images after the plurality of second images is stored in the partial image storing circuitry.

20. An image processing method comprising the steps of:
capturing and storing a plurality of first images at a first field angle using an image pickup apparatus;
detecting a moving distance between a pair of the first images that are sequentially captured; and
during the capturing of the plurality of first images,
cutting out a portion of each of the plurality of first images in accordance with a moving direction of the image pickup apparatus and a moving distance between a pair of the first images sequentially captured to create a corresponding plurality of second images at a second field angle, wherein a length of the plurality of second images in a direction parallel to the moving direction is less than that of the plurality of first images, the plurality of first images having a leading edge and trailing edge in a direction parallel to the moving direction, wherein the cutting out is by cutting through at least one of the leading edge or the trailing edge of the first image only in a direction approximately perpendicular to the moving direction, and
storing only the plurality of second images in a partial image storing circuitry,
in which, during the capturing of the plurality of first images, each second image is stored by discarding the portion of the corresponding first image that is cut out,
wherein a panoramic image is created from the plurality of second images according to the moving distances.

21. A non-transitory recording medium on which is recorded a program for causing an information processing apparatus to perform an image processing method, the image processing method comprising the steps of:

capturing and storing a plurality of first images at a first field angle using an image pickup apparatus;

detecting a moving distance between a pair of the first images that are sequentially captured; and during the capturing of the plurality of first images, cutting out a portion of each of the plurality of first images in accordance with a moving direction of the image pickup apparatus and a moving distances between a pair of the first images sequentially captured to create a corresponding plurality of second images at a second field angle, wherein a length of the plurality of second images in a direction parallel to the moving direction is less than that of the plurality of first images, the plurality of first images having a leading edge and trailing edge in a direction parallel to the moving direction, wherein the cutting out is by cutting through at least one of the leading edge or the trailing edge of the first image only in a direction approximately perpendicular to the moving direction, and storing only the plurality of second images in a partial image storing circuitry, in which, during the capturing of the plurality of first images, each second image is stored by discarding the portion of the corresponding first image that is cut out, wherein a panoramic image is created from the plurality of second images according to the moving distances.

22. An image processing method comprising the steps of:

detecting a moving distance between a pair of sequentially captured first images which are stored, wherein the first images are captured by an image pickup apparatus at a first field angle;

during the capturing of the plurality of first images, generating each of a plurality of second images by cutting out a portion of the corresponding first image in accordance with a moving direction of the image pickup apparatus and a moving distance between a pair of the first images sequentially captured, wherein a length of the plurality of second images in a direction parallel to the moving direction is less than that of the plurality of first images, the plurality of first images having a leading edge and trailing edge in a direction parallel to the moving direction, wherein the cutting out is by cutting through at least one of the leading edge or the trailing edge of the first image only in a direction approximately perpendicular to the moving direction, and storing only the plurality of second images at a second field angle;

in which, during the capturing of the plurality of first images, each second image is stored by discarding the portion of the corresponding first image that is cut out, wherein a panoramic image is created from the plurality of second images according to the moving distances.

23. A non-transitory recording medium on which is recorded a program for causing an information processing apparatus to perform an image processing method, the image processing method comprising the steps of:

detecting a moving distance between a pair of sequentially captured first images which are stored, wherein the first images are captured by an image pickup apparatus at a first field angle; and during the capturing of the plurality of first images, generating each of a plurality of second images by cutting out a portion of the corresponding first image in accordance with a moving direction of the image pickup apparatus and a moving distances between a pair of the first images sequentially captured, wherein a length of the plurality of second images in a direction parallel to the moving direction is less than that of the plurality of first images, the plurality of first images having a leading edge and trailing edge in a direction parallel to the moving direction, wherein the cutting out is by cutting through at least one of the leading edge or the trailing edge of the first image only in a direction approximately perpendicular to the moving direction, and storing only the plurality of second images at a second field angle, in which, during the capturing of the plurality of first images, each second image is stored by discarding the portion of the corresponding first image that is cut out, wherein a panoramic image is created from the plurality of second images according to the moving distances.

\* \* \* \* \*